United States Patent
Tamagnan et al.

(10) Patent No.: US 12,177,084 B2
(45) Date of Patent: Dec. 24, 2024

(54) METHOD FOR PROVIDING DATA RELATING TO AT LEAST ONE EQUIPMENT OF A NETWORK USER, METHOD FOR OBTAINING DATA, AND ENTITIES IMPLEMENTING THESE METHODS

(71) Applicant: Orange, Issy-les-Moulineaux (FR)

(72) Inventors: Philippe Tamagnan, Châtillon (FR); Antoine Mouquet, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/006,906

(22) PCT Filed: Jul. 28, 2021

(86) PCT No.: PCT/FR2021/051409
§ 371 (c)(1),
(2) Date: Jan. 26, 2023

(87) PCT Pub. No.: WO2022/023670
PCT Pub. Date: Feb. 3, 2022

(65) Prior Publication Data
US 2023/0275811 A1    Aug. 31, 2023

(30) Foreign Application Priority Data
Jul. 29, 2020  (FR) ...................................... 2008006

(51) Int. Cl.
*H04L 41/142*   (2022.01)
*H04L 43/065*   (2022.01)
*H04W 24/04*   (2009.01)

(52) U.S. Cl.
CPC .......... *H04L 41/142* (2013.01); *H04L 43/065* (2013.01); *H04W 24/04* (2013.01)

(58) Field of Classification Search
CPC ............ H04W 8/082; H04W 36/00837; H04L 67/51; H04L 43/0888; H04L 43/0864; H04L 43/0847
See application file for complete search history.

(56) References Cited

U.S. PATENT DOCUMENTS

2017/0272962 A1* 9/2017 Lu ..................... H04W 36/0083
2020/0374742 A1* 11/2020 Chong ................ H04W 72/542

OTHER PUBLICATIONS

3GPP TS 29.500, "3rd Generation Partnership Project; Technical Specification Group Core Network and Terminals; 5G System; Technical Realization of Service Based Architecture; Stage 3 (Release 16)", V16.4.0, Jun. 2020.

(Continued)

*Primary Examiner* — Mahran Y Abu Roumi
(74) *Attorney, Agent, or Firm* — David D. Brush; Westman, Champlin and Koehler, P.A.

(57) ABSTRACT

A method for providing data relating to at least one user device to a data analysis entity. The method includes: collecting, for a plurality of events having impacted on at least one state of the user device in the network, data relating to the at least one impacted state; and supplying, to the data analysis entity, for at least one such state of the user device, at least one statistic obtained for this state by aggregating data relating to this state collected during the collecting step and a part of the data corresponding to an integer X greater than or equal to 1 of events among the most recent events of the plurality of events.

15 Claims, 3 Drawing Sheets

(56) References Cited

OTHER PUBLICATIONS

English translation of the Written Opinion of the International Searching Authority dated Nov. 8, 2021 for corresponding International Application No. PCT/FR2021/051409, filed Jul. 28, 2021.
"3rd Generation Partnership Project; Technical Specification Group Services and System Aspects; Study on enablers for network automation for the 5G System (5GS); Phase 2 (Release 17)", No. V0.4.0, Jul. 1, 2020 (Jul. 1, 2020), p. 1-186, 3GPP Standard; Technical Report; 3GPP TR 23.700-91, 3rd Generation Partnership Project (3GPP), Mobile Competence Centre ; 650, Route Des Lucioles ; F-06921 Sophia-Antipolis Cedex ; France, Retrieved from the Internet: URL:ftp://ftp.3gpp.org/Specs.
Orange, "Solution for minimization of data collection", vol. SA WG2, No. Incheon, South Korea; Jan. 13, 2017, Jan. 7, 2020 (Jan. 7, 2020), 3GPP Draft; S2-2000099, 3rd Generation Partnership Project (3GPP), Mobile Competence Centre ; 650, Route Des Lucioles ; F-06921 Sophia-Antipolis Cedex ; France Retrieved from the Internet: URL:https://ftp.3gpp.org/tsg_sa/WG2_Arch/TSGS2_136AH_Incheon/Docs/S2-2000099.zip S2-2000099_eNA_pCR_23.700_91_Orange_KI11_SolutiontoReduceLoad v09.docx, XP051842208.
Orange et al., "KI #11, KI#13, Sol #37: Update to resolve ENs, Include reduction of volume, and detail the triggers", vol. SA WG2, No. e-meeting; Aug. 19, 2020-Sep. 1, 2020, Sep. 2, 2020 (Sep. 2, 2020), 3GPP Draft; 62-2006265, 3rd Generation Partnership Project (3GPP), Mobile Competence Centre ; 650, Route Des Lucioles ; F-06921 Sophia-Antipolis Cedex ; France, Retrieved from the Internet: URL:https://ftp.3gpp.org/tsg_sa/WG2_Arch/TSGS2_140e_Electronic/Docs/S2-2006265.zip S2-2006265.docx.
Ericsson, "Solution to Key Issues 9", S2-186464, SA WG2 Meeting #128, Jul. 2-6, 2018.
3GPP TS 29.518, "3rd Generation Partnership Project; Technical Specification Group Core Network and Terminals; 5G System; Access and Mobility Management Services; Stage 3 (Release 16)", v16.4.0, Jun. 2020, Technical Specification, section 6.2.6.3.3.
3GPP TS 29.508, "3rd Generation Partnership Project; Technical Specification Group Core Network and Terminals; 5G System; Session Management Event Exposure Service; Stage 3 (Release 16)", v16.4.0, Jun. 2020, Technical Specification, section 5.6.3.3.
3GPP TS 23.791, "3rd Generation Partnership Project; Technical Specification Group Services and System Aspects; Study of Enablers for Network Automation for 5G (Release 16)", v16.2.0, Jun. 2019, Technical Report.
International Search Report dated Nov. 8, 2021 for corresponding International Application No. PCT/FR2021/051409, filed Jul. 28, 2021.
Written Opinion of the International Searching Authority dated Nov. 8, 2021 for corresponding International Application No. PCT/FR2021/051409, filed Jul. 28, 2021.

* cited by examiner

[Fig 1]
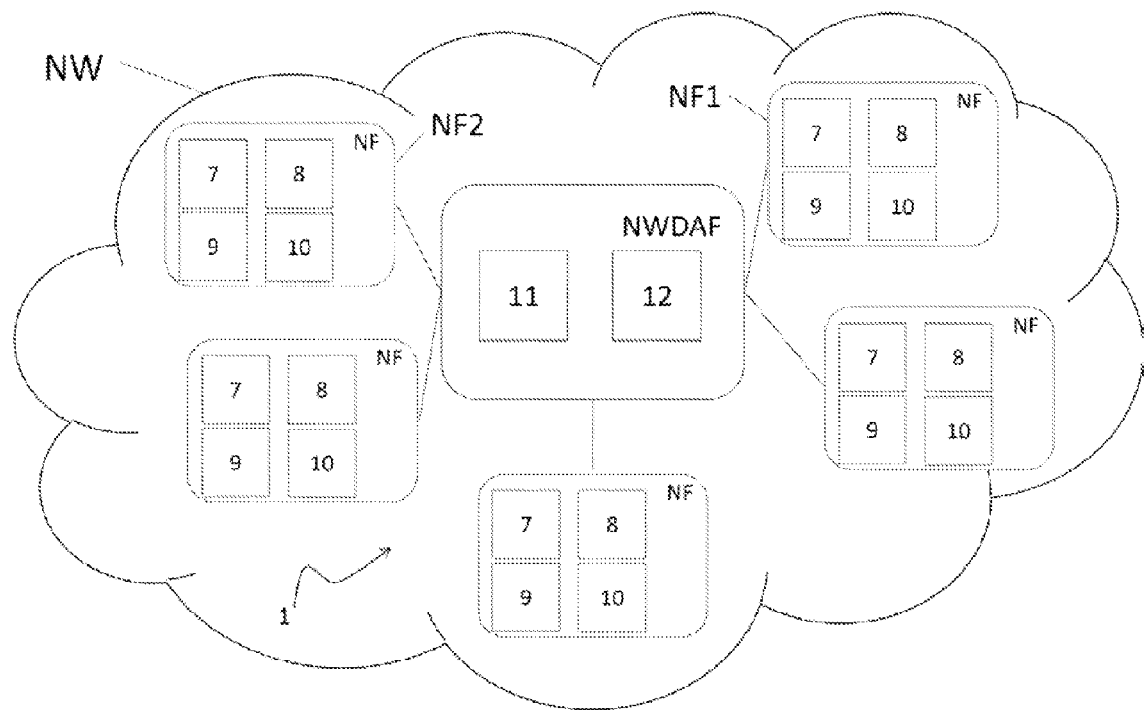
[Fig 2]
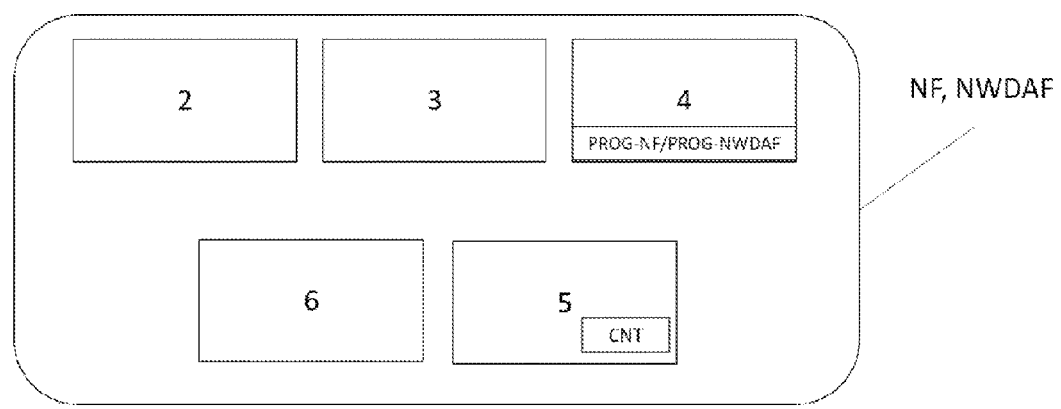

[Fig 3]
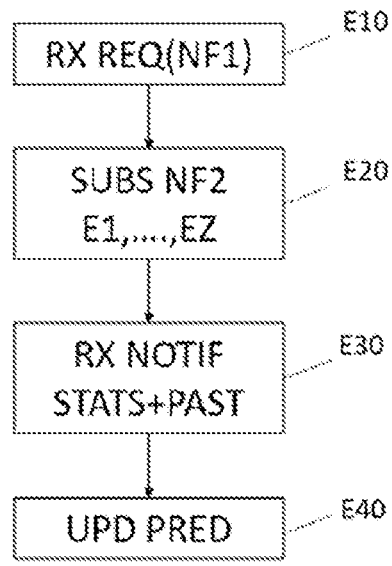
[Fig 4]
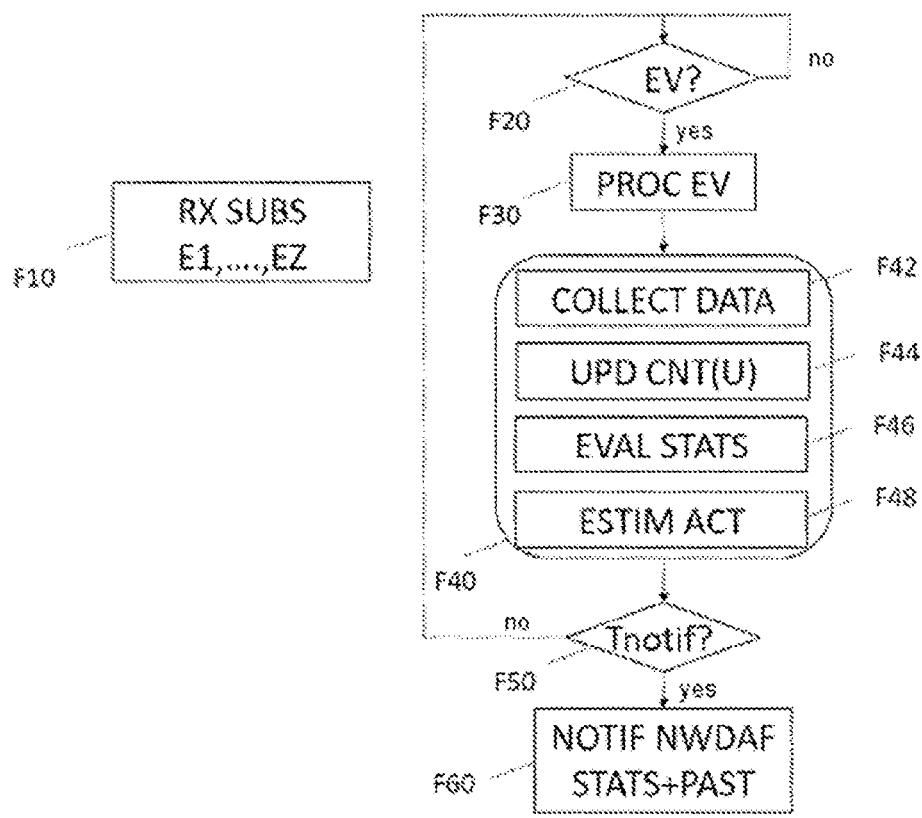

METHOD FOR PROVIDING DATA RELATING TO AT LEAST ONE EQUIPMENT OF A NETWORK USER, METHOD FOR OBTAINING DATA, AND ENTITIES IMPLEMENTING THESE METHODS

CROSS-REFERENCE TO RELATED APPLICATIONS

This Application is a Section 371 National Stage Application of International Application No. PCT/FR2021/051409, filed Jul. 28, 2021, which is incorporated by reference in its entirety and published as WO 2022/023670 A1 on Feb. 3, 2022, not in English.

FIELD OF THE DISCLOSURE

The invention relates to the general field of telecommunications.

BACKGROUND OF THE DISCLOSURE

Modern telecommunication networks, such as, for example, fifth generation or 5G networks defined by the 3GPP standard, encounter complex situations, which are particularly due to the very large number of terminals to be managed, the variety of uses that are made of the network (and the requirements in terms of latency, throughput, resulting volume), as well as the variety of behaviors of the users of the network over time and in space.

In order to address these complex situations, the operators contemplate implementing one or more specialized entities within their networks for carrying out statistical analyses and predictions (also generally referred to as "analytics" in 3GPP documents) concerning the request and the response provided by the network in terms of quality of service. These predictions can be global predictions, that is, be established on the network, a server, an application or even a region. Examples of global predictions are a load rate of the resources of the network, the average quality of service, the number of users connected to the network via their user equipments (or more simply referred to as "UE" hereafter) or of active sessions. Individual predictions, that is, relating to a user or to a group of users also can be established, such as, for example, the future location of the UE of the user or the volume of a future communication session of the user established via their UE. Such entities are also called network Data Analytics Functions (DAF). By way of an illustration, in a core of a 5G mobile network, the Network Data Analytics Function or "NWDAF" fulfils such a role.

The completion of such predictions by a DAF function assumes the prior collection of data representing network facts (for example, connected state of the UE, cell in which it is located, etc., referred to as "raw data" hereafter) with different entities forming the network, also commonly referred to as "Network Functions" (or NF). These raw data can be global (overall) data for each NF function, or even can relate to each user. Once established, the predictions allow anticipated implementation of corrective modifications to the parameters of the network in order to optimize its operation. The entities using these predictions are typically NF functions, customer functions of the DAF function, which may or may not be distinct from the NF functions having collected and provided the DAF function with the raw data. These customer NF functions are then able to adapt their behavior as a function of the predictions received from the DAF function with a view to optimizing the operation of the network and the quality of the service delivered to each user on their UE. The 3GPP TR 23.791 document entitled, "Technical Specification Group Services and System Aspects; Study of Enablers for Network Automation for 5G (Release 16)", v16.2.0, June 2019, describes different use cases of such predictions in a 5G network.

The amount of global raw data to be collected by the DAF function from each NF function (for example, the load level of the NF function, its operating state, etc.) can be fairly substantial, but the number of NF functions requested by the DAF function is actually quite small, which allows the complexity generated by the collection of these global raw data to be limited.

However, the situation is different with respect to the individual raw data relating to the users or to the groups of users, such as, for example, their locations or activities, the variations of the respective states of their UEs (registered, connected, connected on standby, etc.). Collecting these individual raw data in order to establish predictions for each user of the considered network requires feeding back to the DAF function all the network events relating to the UE of this user, wherein the amount of raw data to be fed back can differ from one event to another. Due to the high number of users of the network to be monitored by a DAF function, the amount of individual raw data to be collected by the DAF function therefore can prove to be extremely high, not only causing considerable signaling to be exchanged between the NF functions feeding back these individual raw data and the DAF function, but also a substantial computation load for the DAF function.

Furthermore, even if a user is not directly targeted at a given instant by a statistical analysis or a prediction required by a customer NF function from the DAF function, the DAF function must continuously collect information concerning the network events relating to the UE of this user in order to be able to carry out such a statistical analysis or such a prediction when the request will occur, if applicable.

Therefore, a requirement exists for reducing the amount of raw data to be collected (and incidentally to be processed) by the DAF function with the various NF functions.

In response to this requirement, in terms of the 3GPP standard, document S2-186464 entitled, "Solution to Key Issues 9", Ericsson, 2-6 Jul. 2018, proposes integrating a local DAF function into an NF function in order to be able to carry out prediction computations directly on the NF function. The predictions thus carried out locally by the NF function can be either used directly thereby, or fedback to a central DAF function in order to be used for more complex predictions. The central DAF function can also subscribe to the raw information collected by the NF function being fed back.

In the solution proposed in document S2-186464, a reduction in the amount of information exchanged between the NW function and the DAF function is only permitted if the DAF function uses the predictions made by the NF function. This results in a potential loss of information, which can be detrimental to the statistical analyses and predictions carried out by the DAF function, which is constrained by the predictions carried out by the NF function.

Alternative solutions to that proposed in document S2-186464 can be contemplated for reducing the signaling exchanged between the DAF function and the NF functions of the network.

Thus, a solution can involve continuously collecting individual raw data only for a sample of users considered to be representative of all the users. However; this representativity can only be established by a comparison with the actual behavior of the users that are targeted. Implementing this solution therefore requires the use of a technique for the a priori classification of the behavior of each user before being able to apply a relevant representativity model. The use of this solution can prove to be complicated in some situations, in particular for very mobile, very talkative or even sporadic users, for vehicles or drones.

Another solution can involve carrying out continuous or batch logging of the raw data collected by the NF functions in a data warehouse (also referred to as "data lake") already present in the network, such as, for example, a data lake containing metering tickets (or "Charging Data Records", CDR) reflecting the statistics of the calls and data sessions established on the network. This results in a log of the raw data collected by the NF functions on the users that they manage.

Using such a data warehouse allows the signaling exchanged between the NF functions and the DAF function to be limited. When a request for statistics and/or predictions concerning a user reaches the DAF function, said function can check the data warehouse thus supplied by the NF functions in order to adjust the statistics and predictions that it holds on this user. The DAF function also may have to consult the data warehouse at various suitable times in order to determine the usual behavior of a user.

If this solution is based on an already existing data lake, such as the aforementioned data lake for metering tickets, this data lake may only contain a portion of the raw data required to optimize the operation of the network. Furthermore, the problem of the amount of exchanged raw data remains between the data warehouse and the NF functions.

Another solution involves introducing a specialized mediation entity into the network close to the NF functions. This specialized mediation entity is configured to collect the raw data from the NF functions and to distribute them to the DAF functions that require them. This solution has the disadvantage of introducing new functional entities into the network and therefore of requiring new signaling exchanges. It can have significant deployment consequences, particularly in terms of complexity, computational load, or even operational management.

It should be noted that the previous considerations, although introduced with reference to the 5G networks defined by the 3GPP standard, and to NF and NWDAF entities, apply to any type of telecommunication network in which the operators attempt to collect data from various functions of the network and to make predictions based on these data in order to improve the operation of the network.

SUMMARY

The invention particularly addresses the aforementioned disadvantages of the prior art by providing a method for providing an entity, called data analytics entity, of a network with data relating to at least one user equipment, with this method comprising:
- a step of collecting, for a plurality of events that impacted at least one state of said user equipment in the network, data relating to said at least one state impacted by said events; and
- a step of providing said data analytics entity with the following for at least one of said impacted states of said user equipment: at least one statistic acquired for this state by aggregating data relating to this state collected during the collecting step; and a portion of the data relating to this state collected during the collecting step and corresponding to an integer X greater than or equal to 1 of events from among the most recent events of said plurality of events.

Correspondingly, the invention also relates to an entity comprising modules, activated for at least one user equipment, comprising:
- a collection module, configured to collect, for a plurality of events that impacted at least one state of the user equipment in a network, data relating to said at least one state impacted by said events;
- a module for acquiring statistics, configured to acquire, for at least one of said impacted states of the user equipment, at least one statistic by aggregating data relating to this state that is collected by the collection module; and
- a transmission module, configured to provide an entity, called data analytics entity, of the network, for said at least one impacted state of the user equipment, said at least one statistic acquired for this state by the module for acquiring statistics and a portion of the data collected by the collection module relating to this state and corresponding to an integer X greater than or equal to 1 of events from among the most recent events of said plurality of events.

For the sake of simplification, this entity is referred to as data provision entity or provision entity hereafter.

In a particular embodiment, this entity is an entity of the network, and more specifically an NF (Network Function) entity hosting a network function such as, for example, an AMF (Access and Mobility Management Function) entity or an SMF (Session Management Function) entity of a 5G network in accordance with the 3GPP standard.

Although the technical problem that the invention attempts to address has been emphasized with reference to the exchanges between an NF entity and a DAF or NWDAF data analytics entity of the network, as already mentioned above, the invention is not limited to this context. Thus, the data provision entity also can be, in another embodiment, a user equipment (that is, a UE) of the user such as, for example, a terminal, a sensor, a private automatic branch exchange (PABX) for a company, a customer equipment of the CPE (Customer Premises Equipment) type, etc. There is no limitation to the nature of the user equipment related to the invention. This user equipment is referred to hereafter by equally using the expressions "user equipment", "equipment of the user" or even "UE" for the sake of simplification. The invention thus allows the analytics entity to acquire data relating to a user of a network originating from various sources, which can have access to various types or levels of data concerning the user.

The invention also relates to a method allowing an entity, called data analytics entity, of a network to acquire data relating to at least one user equipment, said analytics entity being able to communicate with at least one other entity configured to collect, for a plurality of events that impacted at least one state of said user equipment in the network, data relating to said at least one impacted state, said method comprising, a step of receiving the following for at least one of said impacted states of said user equipment:
- at least one statistic acquired by the other entity for this state by aggregating data relating to this state collected by said other entity for said plurality of events; and
- a portion of the data relating to this state collected by said other entity for said plurality of events, with said portion of the data corresponding to an integer X greater than or equal to 1 of events from among the most recent events of said plurality of events.

Correspondingly, the invention also relates to an entity, called data analytics entity, of a network able to communicate with another entity configured to collect, for a plurality of events that impacted at least one state of at least one user equipment in the network, data relating to said at least one impacted state, with said analytics entity comprising a reception module activated for said at least one user equipment and configured to acquire the following from said other entity for at least one of said impacted states of said user equipment:

- at least one statistic acquired by said other entity for said state by aggregating data relating to this state collected by said other entity for said plurality of events; and
- a portion of the data relating to this state collected by said other entity for said plurality of events, with said portion corresponding to an integer X greater than or equal to 1 of events from among the most recent events of said plurality of events.

In a particular embodiment, the acquisition method comprises a step of formulating a prediction or a consolidated statistical analysis based on said at least one acquired statistic and of said portion of data.

Correspondingly, the analytics entity further comprises an analytics module configured to formulate a prediction or a consolidated statistical analysis based on said at least one acquired statistic and of said portion of data.

The analytics entity can be a data analytics entity of the network dedicated to this analytics function and being centralized, which is referred to as the DAF entity hereafter for the sake of simplification. Such an entity is an NWDAF entity of a 5G network, for example.

However, the invention also can be applied to other entities. Thus, the analytics entity can be an entity of the network other than a dedicated and centralized DAF or NWDAF entity, as long as this entity is configured to analyze data of the network (that is, relating to the network, to its operation, etc.). It is possible to contemplate, for example, that the analytics entity within the meaning of the invention is an NF entity, which is duly configured to carry out statistical analyses or predictions.

It should be noted that there is no limitation to the nature of the entities involved in the invention, that is, to the data provision entity and to the analytics entity. Indeed, it can involve software entities or functions hosted by various physical devices of the network or physical entities.

There is also no limitation to the nature of the states of a user equipment in the network that can be contemplated within the scope of the invention, with the user being able to designate a single user or a group of users such as, for example, a company or even a machine (for example, a sensor, an actuator, a robot, etc.) operated by a user or a group of users. The notion of a user is associated herein with the existence of a subscription with the operator of the network for this user. The states of a user equipment within the meaning of the invention also can equally refer to general states of this user equipment, such as, for example, "registered", "connected", "not connected", or more specific states such as "present in cell A", "having an ongoing voice communication", etc.

An event within the meaning of the invention is then reflected as a transition between two states of the user equipment (for example, transition from an "unregistered state" to a "registered" state, or "arrival of a user equipment in a cell A"). The impacted states of the user equipment can be deduced from the events detected in the network for this user equipment (for example, start or end of a communication, entry into a cell, etc.).

The invention advantageously proposes a data provision entity (for example, an NF entity) feeding back two types of collected information to an analytics entity (for example, a DAF entity), based on determined events that the provision entity has detected in the network for a given user, in particular in order to allow the analytics entity to establish statistical analyses and/or predictions, with said two types of collected information being:

- on the one hand, statistics, acquired by aggregating raw data (that is, network facts) respectively collected during these events concerning states of the user equipment impacted by these events. It should be noted that a statistic within the meaning of the invention is constructed by consolidating (that is, by aggregating), by means of a given mathematical function (for example, average, variance, etc.), the raw data collected over a determined duration (for example, over a number of determined events or during a determined time window), that is, that it is acquired solely from past raw data (as opposed to a prediction, for example, that provides an indication of the future). In some way, it involves a condensed version representing past raw data, which can be very easily acquired by the provision entity; and
- on the other hand, raw data collected on the most recent events relating to the user that have impacted one or more state(s) of their user equipment. These data reflect the recent past of the user equipment observed in the network. It should be noted that this recent past can have a different time duration depending on the considered users and their respective activities in the network (for some users, the events X can be spread over a longer time window than for other more versatile events in the network). It is possible to contemplate, in a particular embodiment, configuring the number of events X as a function of the type of considered user (for example, mobile user, fixed user, etc.).

These two types of information advantageously allow the exchanges between the data provision entity and the analytics entity to be minimized while maintaining the relevance of the fedback information. By feeding back raw data only relating to the recent past of the considered user equipment, combined with statistics representing a longer time period, the invention offers the analytics entity the possibility of combining two distinct levels of information and supplementing its knowledge of the behavior of the user by productively matching these two levels of information. This matching can be carried out by any means, such as, for example, by means of an evolved prediction algorithm based on Markov chains. The raw data corresponding to the recent past of the user equipment actually provides contextual information (lost when aggregating data to form the statistics), but over a limited time window, which allows the amount of information fed back to the analytics entity to be reduced. The number X of events fed back clearly can be configured, particularly as a function of the events of interest for the user.

The provision entity, like the analytics entity, thus does not need to exhaustively store all the raw collected data concerning the events relating to a user detected in the network. The provision entity also does not need to transmit all the data that it has collected to the analytics entity. Furthermore, the pre-aggregated statistics provided by the provision entity allow the computation and protocol management load of the analytics entity to be reduced.

By way of an illustration, the provision entity is, for example, an AMF network function for managing the access and the mobility of a 5G network. This AMF function can provide a DAF entity of the 5G network (analytics entity within the meaning of the invention), as aggregated statistics, the most frequent locations on different time horizons of a user equipment, as well as the last events relating to the mobility and to the access of this user equipment to the network (including its last locations). It is thus possible for the DAF entity to determine, via the list of the last fedback events, when a user provided with their UE approaches one of their favorite locations (provided by means of the fedback statistics). Furthermore, the knowledge of the topology of the network by the DAF entity, combined with the models established by the DAF entity concerning the long-term behavior of the user, by virtue of the two types of information fedback by the NF entity, can allow it to predict the next locations of the user (in other words, of their UE).

Of course, this example is provided solely by way of an illustration, and other NF functions (for example, a session management function (SMF)), and/or other events and/or other statistics (for example, communication statistics) can be contemplated.

In a particular embodiment, at least one of said statistics relating to a state of the user equipment is updated incrementally for each detected event relating to the user equipment and impacting this state.

In other words, for each new detected event E(N) affecting the considered state, with N denoting an integer greater than 1, the relevant statistic relating to this state, denoted G(N), for example, is acquired from the value G(N−1) of the statistic acquired when detecting the preceding event affecting said state and the single event E(N).

In this way, the amount of data to be stored by the provision entity is further limited (the oldest events do not need to be retained apart from those belonging to the recent past fedback to the analytics entity and the event E(N)) and therefore as are the constraints in terms of storage capacity of the provision entity. Furthermore, the computations carried out by the latter in order to acquire the statistics are simplified.

Thus, information is available on the analytics entity for all the users managed by the provision entity through a reasonable effort in terms of memory and computation for the provision entity.

Various types of statistics can be assessed by the provision entity.

Thus, a statistic can be assessed, for example, on a sliding time window or on a sliding number of events.

A statistic also can be assessed over a periodic time window with a period denoted T or over a time window with a width that is equal to an integer multiple of the period T. This allows exact statistics to be acquired that are assessed over a fixed duration, which can be longer or shorter depending on the contemplated variant. In particular, if a window with a width equal to an integer multiple Q of a period T is contemplated for assessing a statistic, this allows a statistic to be acquired over a fairly long period of duration Q.T, representing a long-term behavior of the user. Such a statistic can be derived from statistics acquired over a periodic time window with a period T, without having to store additional data other than the statistics that are periodically assessed over each period.

The provision entity can thus assess several statistics relating to a state of the user according to one and/or the other of these techniques. Of course, other techniques can be contemplated as a variant.

In a particular embodiment, a statistic can be assessed using an exponential moving average (or EMA).

This embodiment (EMA) allows, for example, estimated statistics to be acquired concerning the separation between two events affecting the same state (for example, average and variance).

As described above, according to the invention, the provision entity supplies the analytics entity with statistics assessed on the raw data that it has collected for the considered user equipment, as well as on raw data representing the recent past of the user in the network. However, it is possible to contemplate that the provision entity provides the analytics entity with other information in addition to the aforementioned information.

Thus, in a particular embodiment, the provision method further comprises providing said analytics entity, for each type of event of said plurality of events, at least one activity indicator for this type of event.

Correspondingly, the acquisition method comprises acquiring, for each type of event of said plurality of events, at least one activity indicator for this type of event.

Such an activity indicator for a given type of event (for example, presence in a cell, loss of communication, etc.) comprises, for example, an estimate (average and variance) of a separation duration between two events of this type detected in the network for the user equipment. Of course, other types of activity indicator can be contemplated, such as, for example, an estimate of the regularity of the events of this type indicating whether the events of this type are separated fairly constantly or variably.

The activity indicators advantageously allow an activity profile of the user to be established in the network (for example, frequency of their movements, the quality of their near radio environment, etc.), so as to better characterize the user: For example, this allows a behavior involving extended parking in one cell and then in another cell to be distinguished from a behavior involving frequent return trips between these two cells for identical cumulated durations.

This knowledge of the activity indicators per type of event also offers the possibility of selecting a more relevant computation model for the statistical analyses and the predictions made by the analytics entity for this user.

In a particular embodiment, the provision method according to the invention comprises a step of filtering the collected data as a function of a representativity of said data of a usual state of said user equipment.

This filtering allows only the most significant values of the behaviors of the user to be retained and thus allows the storage capacity required for implementing the invention to be limited.

As an alternative embodiment, it is possible to otherwise contemplate retaining the least significant values of the usual state of the user equipment and eliminating some values more consistent with this usual state, considered to be redundant with other data already fed back or not providing additional information with respect to the fed back statistics.

Different criteria can be applied for filtering the collected data. Thus, for example, the data can be filtered as a function of their collection instants (for example, the oldest data are deleted), the number of events associated with said data, the total duration of the events, etc.

In a particular embodiment, the provision step is determined by an explicit notification request from the analytics entity.

Such an explicit notification request can, for example, be in the form of a subscription or of a membership with the provision entity by the analytics entity in order to be notified of the items of information collected by the provision entity concerning a determined user or, similarly, a determined user equipment. This allows automatic notification of the analytics entity.

As an alternative embodiment, it can involve an occasional or recurrent request (for example, periodically) of the analytics entity.

In a particular embodiment, the provision step of the acquisition method according to the invention is implemented periodically and/or in response to a request from the analytics entity.

As an alternative embodiment, the provision step can be triggered by the detection of a specific criterion, for example, a threshold being exceeded.

In a particular embodiment of the invention, the provision and acquisition methods are implemented by a computer.

The invention also relates to a computer program on a storage medium, with this program being able to be implemented in a computer or more generally in a data provision entity according to the invention and comprises instructions adapted to the implementation of a provision method as described above.

The invention also relates to a computer program on a storage medium, with this program being able to be implemented in a computer or more generally in an analytics entity according to the invention and comprises instructions adapted to the implementation of an acquisition method as described above.

Each of these programs can use any programming language, and be in the form of source code, object code, or intermediate code between source code and object code, such as in a partially compiled format, or in any other desirable format.

The invention also relates to a computer-readable information medium or storage medium, and comprising instructions of a computer program as mentioned above.

The information or storage medium can be any entity or device capable of storing the programs. For example, the medium can comprise a storage means, such as a ROM, for example, a CD-ROM or a microelectronic circuit ROM, or even a magnetic recording means, for example, a hard disk, or a flash memory.

Furthermore, the information or storage medium can be a transmittable medium such as an electrical or optical signal, which can be routed via an electrical or optical cable, by a radio link, by a wireless optical link or by other means.

The program according to the invention particularly can be downloaded over a network of the Internet type.

Alternatively, the information or storage medium can be an integrated circuit in which a program is incorporated, with the circuit being adapted to execute or to be used to execute the provision and acquisition methods according to the invention.

According to another aspect, the invention relates to a telecommunication system comprising at least one data provision entity and an analytics entity according to the invention.

The system according to the invention benefits from the same advantages mentioned above as the provision and analytics entities according to the invention.

In a particular embodiment, the data provision entity is an entity of the network managing a plurality of user equipments of the network, such as, for example, an NF entity hosting a network function.

In another embodiment, the data provision entity is the considered user equipment, that is, for example, the terminal of the user.

It is also possible to contemplate, in other embodiments, that the provision and acquisition methods, the provision and analytics entities and the system according to the invention in combination have all or some of the aforementioned features.

BRIEF DESCRIPTION OF THE DRAWINGS

Further features and advantages of the present invention will become apparent from the following description, with reference to the appended drawings, which illustrate a non-limiting embodiment. In the figures:

FIG. 1 shows a telecommunication system according to the invention in its environment in a particular embodiment;

FIG. 2 schematically shows the hardware architecture of a provision entity and an analytics entity of the system of FIG. 1;

FIG. 3 uses a flowchart to illustrate the main steps of an acquisition method as implemented in a particular embodiment by the analytics entity (DAF entity) of the system of FIG. 1;

FIG. 4 uses a flowchart to illustrate the main steps of a provision method as implemented in a particular embodiment by a data provision entity (NF entity) of the system of FIG. 1;

DETAILED DESCRIPTION OF ILLUSTRATIVE EMBODIMENTS

Figure 5A:
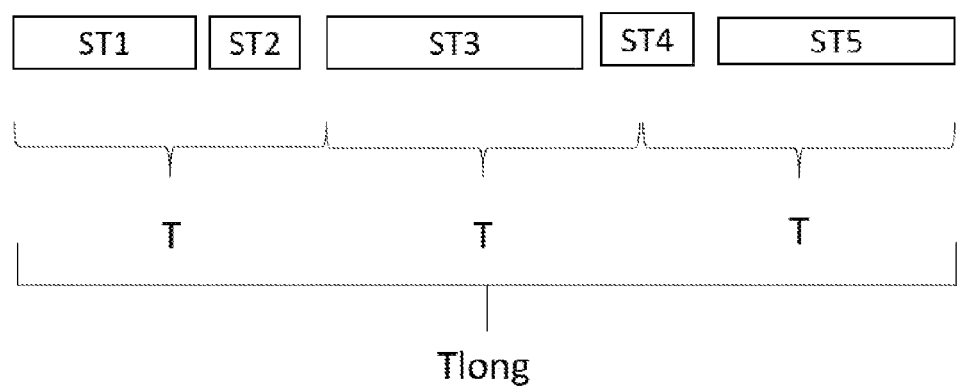
FIGS. 5A and 5B illustrate various ways of assessing statistics (periodic window and sliding window, respectively).

FIG. 1 shows a telecommunication system 1 according to the invention in its environment in a particular embodiment. The system 1 offers the possibility, resulting in reduced complexity, of collecting information concerning various events detected in a telecommunication network NW and relating to users or to groups of users of the network (and more specifically to their respective user equipments (UEs)) in order to carry out statistical analyses and/or predictions for optimizing the operation of the network NW.

The term "event relating to or concerning a user equipment" is understood herein to mean an event detected in the network resulting in a transition between two states of the user equipment (for example, the movement of the user equipment from one cell to another, the transition of the user equipment from an "unregistered" state to a "registered" state, etc.). There is no limitation to the nature of the considered events, nor to the nature of the states of the considered user equipment. As mentioned above, a state of a user equipment within the meaning of the invention can equally designate general states of this user equipment, such as, for example, "registered", "connected", "not connected", and more specific states such as "present in cell A", "having an ongoing communication", etc.

In the example contemplated in FIG. 1, the telecommunication network NW is a 5G network as defined in the 3GPP standard (except for functions specific to the invention). However, this hypothesis is not limiting per se and the invention applies to other types of network (6G, proprietary telecommunication networks, etc.).

According to the invention, the system 1 comprises at least one data provision entity according to the invention. In the embodiment contemplated herein, this provision entity is an NF entity (or even an NF (Network Function) function) managing a plurality of user equipments of the network and hosting at least one network function.

In a manner known per se, an NF entity is a functional block (software or physical) characterized by a behavior (in order to provide the service associated with said network function) and defined external interfaces. There is no limitation to the network functions hosted by the NF entities: management of access to the network, management of the mobility of the users (that is, of their user equipments), management of the communication sessions of the users via their user equipments, storage of the user profiles, gateway between networks, etc. The NF entities can be located in the control plane as in the user plane. By way of an example, such an NF entity is, for example, an AMF function for managing the mobility and the access of users or a session management function (SMF), etc.

Each NF entity of the system 1 is configured herein to collect "raw" data (that is, facts or information concerning the facts taking place in the network) concerning a set of determined events that it exposes, relating to the user equipments that they manage, with these events being related to the one or more network function(s) that it provides. The types of events exposed by an NF entity have a fixed number, typically for a 5G 3GPP network, approximately ten types of different events in general. Thus, for example, an AMF entity is able to collect data concerning mobility events relating to the user equipments that it manages, such as the movement of a user equipment from one cell to another; etc. Furthermore, according to the invention and as described in further detail hereafter, each NF entity of the system 1 is configured to assess various statistics based on the raw data that it collects. The events exposed by an NF entity are defined for each NF entity and are known to the other entities of the network. For example, for an AMF entity, these events, numbering 16, are described in the 3GPP TS 29.518 document entitled, "Technical Specification Group Core Network and Terminals; 5G System; Access and Mobility Management Services; Stage 3 (Release 16)", v16.4.0, June 2020, section 6.2.6.3.3. For an SMF entity, there are 10 of these events and they are described in the 3GPP TS 29.508 document entitled, "Technical Specification Group Core Network and Terminals; 5G System; Session Management Event Exposure Service; Stage 3 (Release 16)", v16.4.0, June 2020, section 5.6.3.3.

The system 1 also comprises an entity, called DAF analytics entity, according to the invention. In the embodiment described herein, this analytics entity is a centralized NWDAF (NetWork Data Analytics Function) entity in charge of the analysis of the data of the network NW, and configured to centrally carry out various statistical analyses and/or predictions from items of information collected from one or more NF entities. These statistical analyses and/or predictions particularly can be carried out by the NWDAF entity on the request of customer NF entities, which can be identical or distinct from the NF entities that collect the raw data concerning the events relating to the users of the network NW. For the purposes of the statistical analyses and the predictions that it has to carry out, the NWDAF entity can also collect items of information from entities other than the NF entities, such as, for example, a network management entity, also known as an OAM (Operation, Administration and Maintenance) entity, or application functions (AF), or even network user equipments.

In order to collect these items of information, the NWDAF entity can subscribe, for a particular user or a group of users, and for all or some of the types of events exposed by an NF entity, to be notified by NF entity of items of information relating to these types of events as soon as they are detected by the NF entity in the network and that they impact the state of the equipment (UE) of this user. This notification can be carried out periodically, for example, or upon detection of any other criterion (for example, a given threshold being exceeded by a parameter observed by the NF entity). In an alternative embodiment, the NWDAF entity can also request, on its own initiative, periodically or at determined instants, that an NF entity provides it with items of information concerning the types of events that it exposes in relation to a user or a determined group of users. In the embodiment described herein, this subscription allows the NWDAF entity to benefit from the items of information that the NF entity has collected according to the invention after events have occurred that correspond to the types of events specified in the subscription of the NWDAF entity and that have impacted the state of a user equipment (UE) of a given user. In the embodiment described herein, as described in further detail hereafter, these items of information include the statistics aggregated by the NF entity concerning the various states of the user equipment detected during these events, the collected raw data relating to an integer X of the most recent events detected for the user (with X being able to be defined by the NWDAF entity during its subscription or being determined by the NF2 entity or even set by default), and for each type of event specified in the subscription of the NWDAF entity, an activity indicator of this type of event for the user equipment. It should be noted that, as an alternative embodiment, the NWDAF entity can request to receive only a portion of these items of information (for example, only the recent statistics and events).

The NF and DAF entities of the system 1 are respectively configured herein to implement a method for providing data and a method for acquiring data according to the invention. To this end, these entities rely on, in the embodiment described herein, the hardware architecture of a computer as schematically shown in FIG. 2. This hardware architecture can be that of the considered entity or of the physical device that hosts it that then the entity uses when said entity is implemented in the form of a software function.

This architecture particularly comprises a processor 2, a random-access memory 3, a read-only memory 4, a non-volatile memory 5, and communication means 6 particularly comprising various physical and protocol interfaces allowing the NF and DAF entities to communicate with one another, but also with other entities of the network. Such interfaces are described, for example, in the 3GPP TS 29.500 document entitled, "Technical Specification Group Core Network and Terminals; 5G System; Technical Realization of Service Based Architecture; Stage 3 (Release 16)", v16.4.0, June 2020, and more particularly for the AMF and SMF entities in the previously cited 3GPP TS 29.518 and TS 29.508 documents.

The read-only memory 4 constitutes a storage medium according to the invention, which can be read by the processor 2 and which includes a computer program according to the invention, namely the PROG-NF program for the NF entity and the PROG-DAF program for the DAF entity.

The PROG-NF program defines functional modules of an NF entity according to the invention, which are based on or control the aforementioned hardware elements 2 to 6. These modules in this case are activated, for at least one user equipment (UE) of a user managed by the NF entity and for determined types of events that it exposes, and comprise, in the embodiment described herein, as shown in FIG. 1:

a collection module 7, configured to collect data (referred to as "raw" data herein) for a plurality of events relating to this user equipment detected in the network NW (there is no limitation to the device detecting these events). These data relate to the states of the user equipment impacted by the detected events. It involves, for example, features that the NF entity must expose with the events that it detects, but other data also can be collected;

a statistics assessment module 8 (module for acquiring statistics within the meaning of the invention), configured to assess, for at least one state of the user equipment, one or more statistic(s) by aggregating raw data relating to this state and collected by the collection module 7;

a module 9 for estimating statistics, called profiling statistics, profiling the users and the events of the network, the module 9 being in this case configured to assess, for each type of event exposed by the NF entity and for the considered user equipment, an activity indicator of this type of event. Such an activity indicator of a given type of event is, for example, an estimate (for example, average and variance) of the separation duration between two events of this type for the user equipment, or an estimate of the regularity of the occurrence of the events of this type reflecting whether the events of this type are separated fairly constantly or variably for the user equipment; and a transmission module 10, configured to provide the NWDAF entity with different items of information concerning the user equipment via the interface provided to this end, namely one or more statistic(s) assessed by the module 8 for assessing statistics concerning states of the user equipment, raw data collected by the collection module 7 concerning the last X events detected in the network for the user equipment and that impacted these states, with X denoting an integer greater than or equal to 1, and the activity indicators of each type of event exposed by the NF entity and concerning the user equipment, estimated by the profiling statistics estimation module 9.

The functions provided by these modules 7 to 10 are described in further detail hereafter with reference to the steps of the provision method according to the invention.

Similarly, the PROG-DAF program defines functional modules of an NWDAF entity according to the invention, which is based on or controls the aforementioned hardware elements 2 to 6. These modules are activated for at least one user equipment and comprise, in the embodiment described herein, as shown in FIG. 1:

a transmission/reception module 11, configured to acquire different items of information concerning the user equipment from each NF entity requested by the NWDAF entity via the interface provided to this end, and more particularly, the items of information described above and provided by the transmission module 10 of the NF entity; and an analysis and prediction module 12, configured to carry out statistical analyses and/or predictions based on the items of information acquired by the transmission/reception module 11 for one or more user(s). The statistical analyses and predictions that are conducted can be requested by one or more customer NF entities of the NW network as mentioned above, and the nature of these statistical analyses and of these predictions depends on the NF entities from which these requests originate. It can particularly involve global predictions (relating to the network, to a region, etc., such as, for example, the load rate of the resources of the network, the average quality of service provided, the amount of connected user equipments or of active sessions, etc.) or individual predictions (relating to a particular user or to a group of users, for example, "a user equipment (UE) of a user U1 will be in cell A in 10 minutes", or "80% of the user equipments (UE) of the users of group G will be in cell B in 15 minutes", etc.). Such predictions can be carried out using models and prediction algorithms that are known to a person skilled in the art and are not described herein, such as, for example, machine learning techniques, and more particularly for predictions relating to the location of a user equipment, namely the LSTM ("Long-Short Term Memory") technique. It should be noted that the analysis and prediction module 12 also can be configured to carry out targeted monitoring of a particular user over a short time window and, to this end, to be able to activate the transmission/reception module 11 in order to request, from the NF entities of the system 1, items of information concerning the equipment (UE) of this particular user over a given time period.

The functions provided by the modules 11 and 12 of the NWDAF entity are described in further detail hereafter with reference to the steps of the acquisition method according to the invention.

The main steps of an acquisition method and a provision method according to the invention as they are implemented, in a particular embodiment, by the NWDAF entity of the system 1 and by each NF entity of the system 1 requested by the NWDAF entity will now be described with reference to FIGS. 3 and 4, respectively.

With reference to FIG. 3, it is previously assumed in this case that an NF entity of the network NW, for example, the customer entity NF1 identified in FIG. 1, requests that the NWDAF entity carries out a statistical analysis or a given prediction (step E10). By way of an illustration, it is assumed in this case that the prediction requested by the entity NF1 aims to determine the next three cells that will be visited by the user equipment (UE) of a user U, referred to as UE(U) throughout the remainder of the description and equally denoted user equipment UE(U) or even equipment UE(U) of the user U or even quite simply equipment UE(U). As mentioned above, there is no limitation to the nature of the equipment UE(U) of the user U; it is a terminal in this case, for example.

Of course, this example is provided solely by way of an illustration and other predictions or statistical analyses can be contemplated, relating to a single user, a plurality of users or even a determined group of users, as well as other user equipments (for example, CPE, PABX, sensor, etc.).

Following this request, in the embodiment described herein, the NWDAF entity subscribes, with the relevant NF entities of the system 1 (that is, those likely to provide it with information for carrying out the statistical analysis or the prediction requested by the customer entity NF1), to the notification, for the equipment UE(U) of the user U and for all or some of the events exposed by the entities, items of information collected by these entities concerning the equipment UE(U) of the user U during these events (step E20). This subscription constitutes an explicit request for notification from the NWDAF entity. It is assumed herein that the NWDAF entity subscribes to a periodic notification (of period Tnotif) of the items of information exposed by the NF entities.

The events for which it is subscribed for the equipment UE(U) of the user U are selected by the NWDAF entity as a function of the statistical analysis or of the prediction that it must carry out.

The NWDAF entity can also, independently of this subscription, record, with the NF entity and asynchronously and on its own initiative via a request provided to this end, for the events relating to the equipment UE(U) of the user U detected by the NF entity, the items of information that the NF entity collected during these events, for example, as mentioned above, in order to carry out targeted monitoring of the user U (i.e., their user equipment UE(U)) over a short time period, or to bolster its prediction models concerning the user U.

In the example contemplated herein, for the sake of simplification, it is assumed that the NWDAF entity sends a subscription request to a single NF entity, namely the NF2 entity identified in FIG. 1, and that it subscribes to the notification of all the items of information collected by the NF2 entity during events corresponding to all the types of events E1, ..., EZ exposed by the NF entity, with Z denoting an integer greater than or equal to 1, (statistics of the states of the equipment UE(U), X last events, with X being an integer greater than or equal to 1, with each event being defined by means of a certain number of features depending on the type of event, and activity indicators for each type of event E1, ..., EZ).

As an alternative embodiment, it can subscribe to notifications of this type from a plurality of NF entities, and select only a subset of the events exposed by each of the NF entities. It should be noted that the operating mode described hereafter for the NF2 entity applies to any NF entity of the system 1 according to the invention.

By way of an illustration, when the NF2 entity is an AMF function as mentioned above, 16 types of events can be exposed by the AMF function on its API Namf_EventExposure, as indicated in the previously cited 3GPP TS 29.518 document. These events include, for example: the location of the considered user equipment ("Location-Report"), the presence of the user equipment in a zone of interest ("Presence-In-AOI-Report"), the time zone of the user equipment ("Time-Zone-Report"), the type of access network of the user equipment ("Access-Type-Report"), the registration state of the user equipment ("Registration-State-Report"), the connection state of the user equipment ("Connectivity-State-Report"), the accessibility state of the user equipment ("Reachability Report"), a failure of the communication of the user equipment ("Communication-Failure-Report"), etc.

As mentioned above, each event is modelled by means of a plurality of features. The data collected by the NF entities (and therefore the NF2 entity) are partly conditioned by these features. In the previous illustrative example of the AMF function, the "Location-Report" event is, for example, modelled by the following features: identifier of the user equipment and location of the user equipment (in the form of a TAI (Tracking Area Identity) identifier, of a cell identifier (or Cell-ID), of a wired line identifier (or Global Line ID), etc.). The "Presence-In-AOI-Report" event is modelled by the identifier of the user equipment, the identifier of the zone and the presence state ("in", "out" or "unknown").

With reference to FIG. 4, the NF2 entity records the subscription of the NWDAF entity relating to the types of events E1, ..., EZ for the equipment UE(U) of the user U and the associated notification period Tnotif (step F10).

At the same time as the subscriptions received by the NF2 entity, this entity continuously maintains a context CNT for each user equipment of the network NW that it is required to manage (that is, which it is involved in when it uses the network NW), and therefore particularly for the equipment UE(U) of the user U, in which context CNT it records various items of information relating to the types of events E L ..., EZ detected in the network for the user equipments (UEs) of these users. The contexts CNT are stored, for example, in the non-volatile memory 5 of the NF2 entity. Throughout the remainder of the description, the context of the equipment UE(U) of the user U (also referred to hereafter as context of the user U for the sake of simplification), denoted CNT(U), is more particularly of interest, but all the contexts of users maintained by the NF2 entity are managed thereby in the same way as the context CNT(U).

More particularly, the context CNT(U) of the user U in this case includes a table TAB(U) listing the states of the equipment UE(U) of the user U impacted by the events detected in the network for this equipment. Each distinct state assumed by the equipment UE(U) during such an event is stored in the table TAB(U) in conjunction with the features that define it. As mentioned above, the table TAB(U) can list general states of the equipment UE(U), such as the "connected", "registered" state, but also more specific states of the equipment UE(U), such as "present in cell A", "present in cell B", etc. It should be noted that an event can impact several states of the equipment UE(U) in the table TAB(U).

The table TAB(U) also comprises, for each state of the equipment UE(U) of the user U, statistics relating to this state, assessed by the NF2 entity, as described in further detail hereafter. As indicated above, it should be noted that a statistic, within the meaning of the invention as assessed by the NF2 entity, is acquired by consolidating (i.e., by aggregating) by means of an elementary mathematical function (for example, an average function, variance function, etc.) of the raw data in relation to the states assumed by the equipment UE(U) during detected events, collected by the NF2 entity up to a given instant (for example, the instant at which the statistic is requested, or the instant at which the statistic is assessed, etc.): it is therefore only acquired from past raw data collected by the NF2 entity (as opposed to a prediction that provides an indication of the future). In some way, it involves a condensed version representative of the past raw data, which can be very simply acquired by the NF2 entity. Such statistics are typically the average duration of a state of the equipment UE(U) and its variance, the average separation between two occurrences of this state and its variance, the number of occurrences of this state, etc. The manner in which these statistics can be assessed is described in further detail hereafter.

Furthermore, it is also assumed herein that, for each state of the equipment UE(U) of the user U, in other words for each entry of the table TAB(U), this table includes a time-stamp of the start and of the end of the last occurrence of this state.

In the embodiment described herein, in addition to the table TAB(U), the context CNT(U) of the user U also comprises:

profiling statistics relating to each of the possible types of events for the equipment UE(U). These profiling statistics in this case are made up of activity indicators of the possible type of events for the equipment UE(U). These activity indicators are also described in further detail hereafter; and a table PAST(U) intended to include the data collected by the NF2 entity concerning the X most recent events relating to the equipment UE(U) that impacted the states of this user equipment. In this case, X designates an integer that can be fixed by default, or selected by the NF2 entity or even by the NWDAF entity. This number X can be selected as such or deduced from a fixed maximum time window in order to define the recent past of the events to be considered.

The NF2 entity then provides each user context CNT that it maintains as follows.

When a new event is detected by the NF2 entity for a user equipment ("yes" response in test step F20), for example, for the equipment UE(U) of the user U, the NF2 entity processes this event in a manner known per se (in the example contemplated herein of a network NW in accordance with the 3GPP standard, as defined by the standard) (step F30), then updates the context CNT(U) of the user U in its non-volatile memory 5 (step F40).

In order to carry out this update, the NF2 entity collects, via its collection module 7, the data relating to the detected event characterizing the one or more state(s) of the equipment UE(U) impacted by this event (for example, for a change of location, the data relating to its new location and in particular the identifier of the new cell, the timestamp of the end of presence in the previous location, etc.) and stores them in the table PAST(U) (step F42). If the table PAST(U) already includes X events, the oldest event is deleted in order to be able to store the data relating to the new detected event. It should be noted that the collection module 7 can determine these data directly or receive them from other entities of the network.

The data relating to a state of the equipment UE(U) impacted by the new detected event are either recorded by the collection module 7 in an existing entry of the table TAB(U) of the context CNT(U) of the user U corresponding to the same state of the user equipment UE(U) (for example, presence in the same cell), or, if no existing input corresponds to the same state (for example, new cell, new communication, etc.), result in the creation by the collection module 7 of a new entry in the table TAB(U) (step F44).

As an alternative embodiment, updating the context CNT (U) with the data relating to the detected event can be carried out by a module of the NF2 entity other than the data collection module 7.

Then, the NF2 entity assesses the statistics associated with each entry that has just been created or entered in the table TAB(U) (step F46). In the embodiment described herein, in order to preserve the storage resources of the NF2 entity and in particular the space occupied by the user contexts CNT in the non-volatile memory 5, the statistics are actually updated incrementally. In other words, each time (indexed by the integer n) that a statistical quantity G of the table TAB(U) is assessed for a state denoted ST of the considered user equipment, its value G(n) is computed by only considering the value G(n−1) of the statistical quantity acquired during the previous assessment of the quantity G stored in the table TAB(U) and the current value of the state denoted ST(n) associated with the new detected event. In this way, it will suffice for only the assessed statistics and the current number of considered events for assessing these statistics to be stored in the memory.

Various types of statistics can be assessed by the assessment module 8 of the NF2 entity and stored in the table TAB(U) of the user U. In the example contemplated herein, the following are considered:

statistics STAT1 assessed over a determined number Ne of events;

statistics STAT2 assessed over a periodic time window of width and of period T (for example, T=1 hour), as illustrated in FIG. 5A (in this figure, ST1, ST2, . . . , ST5 represent states of the user equipment UE(U)); and statistics STAT3 assessed over longer time windows of widths Tlong equal to multiple integers Q1, Q2, etc. of the period T (for example, Tlong=6 hours, 24 hours, etc.), as also shown in FIG. 5A.

Of course, this example is provided solely by way of an illustration and other configurations of statistics can be considered for each state of the table TAB(U) (for example, a statistic for each type of statistics mentioned above, or only statistics assessed on a determined number of events, or periodic statistics and statistics on time windows equal to multiples of the period, etc.).

Figure 5B:
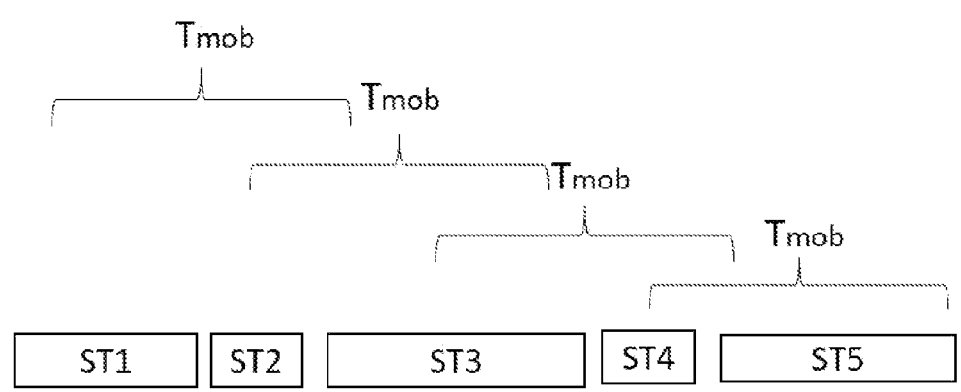

Furthermore, other types of statistics can be considered within the scope of the invention, such as, for example, statistics assessed by means of a continuous moving window (i.e., sliding). As illustrated in FIG. 5B, the use of a continuous sliding window involves continuously sliding a computation window with a time width $T_{mob}$ on the relevant collected data for assessing the statistics: thus, at an assessment instant t, the acquired statistics relate to the data collected in the time range located between the instants $t-T_{mob}$ and t. In order to be able to acquire exact statistics with a continuous sliding window, it is necessary to store the data relating to the states and to the events detected on this time window, as well as all the timestamps (start and duration) of the states, in addition to the statistics. The statistics are also assessed in real time, even if the arrival of the data is asynchronous. This can represent a significant level of complexity if dozens of statistics are to be maintained for each user. It is preferable for this technique to be used on fixed elements (for example, events), that is, that are not likely to vary during the sliding window.

As indicated above, in the embodiment described herein, an incremental approach is considered for assessing the statistics STAT1, STAT2, STAT3.

More particularly, the assessment module 8 in this case uses the Exponential Moving Average, or EMA, technique to acquire the statistics STAT1 and STAT3. These statistics in this case relate to, for a given state of the equipment UE(U) of the user U, the duration of the occurrence of this state (average and variance), and to the separation between two occurrences of this state (average and variance). The number of occurrences of the state is simply incremented upon each new occurrence.

In a manner known per se, using the previous notations, according to the EMA technique, when the statistical quantity G to be assessed is an average, its value G(n) during a step indexed by an integer n is deduced from that computed in the preceding step n−1 as follows:

$$G(n)=(1-A)\cdot G(n-1)+A\cdot E(n),$$

where A denotes a smoothing constant ranging between 0 and 1. The value of the smoothing constant A determines whether or not significant importance is given to the past in order to estimate the statistical quantity G(n). For example, A=2/(1+P) can be selected, with P being the number of moving average samples to be averaged. Thus, for example, A=0.25 corresponds to a moving average estimated on 9 samples.

In the embodiment described herein, for the statistics STAT1, P denotes the number of events Ne to be averaged in order to acquire these statistics. For the statistics STAT3, P denotes the multiple Q1, Q2, etc. of the period T considered to assess these statistics based on the statistics STAT2.

By virtue of this EMA technique, the assessment module 8 of the NF2 entity can thus easily estimate the average duration spent by the equipment UE(U) in a considered state or the average elapsed time between two occurrences of this state.

The EMA technique also can be used by the assessment module 8 of the entity 2 in order to estimate variances. Indeed, by definition, the variance corresponds to the average of the squares of the deviations relative to the average. It is therefore possible to apply the Exponential Moving Average technique, considering the average of the squares of the deviations of the data relative to the estimate of the average.

It should be noted that the EMA technique as such does not provide information on whether the statistics thus assessed correspond to a time window of identical width for different users. The considered time window actually depends on the rate of activity of the user, with this rate being able to vary from one user to another: depending on whether the user is more or less active, they can generate more or less states over the same time period. If the intention is to connect the acquired statistics in real time, then considering periodic time windows is preferable. The use of the EMA technique can be favored for periodically produced data, or even if, as is the case herein, an average is sought that is assessed over a determined number of data without connecting this average to the notion of time.

As mentioned above, in order to acquire the statistics STAT2, the assessment module 8 considers a periodic time window of width and period T. This technique involves moving the computation window by successive hops of duration T. It thus acquires statistics assessed over several successive ranges of width T. At an assessment instant t=kT, the statistics that are acquired therefore relate to the collected data relating to the states detected in the current time range $[(k-1)T, kT]$, where k denotes an integer.

The statistics STAT2 assessed over a periodic time window of width T advantageously allow periodic statistics to be acquired concerning elementary data that are not, and do not require, data storage except for the current number of events and timestamps of the first and last states detected in the window. These statistics S iAT2 are reset to zero in this case at the beginning of each period of width T for each state of the equipment of each user managed by the NF2 entity, and assessed over the considered period by carrying out an incremental accumulation operation for each new detected event impacting the states to which they relate for a user equipment of a given user.

In the embodiment contemplated herein, the implemented incremental accumulation operation is a simple recurrence. More specifically, if the statistical quantity G(N) that the assessment module 8 seeks to assess on n occurrences of a state that has occurred since the beginning of the period of duration T is an average (for example, an average duration of the user equipment in a given state or an average separation between two occurrences of this state), the assessment module 8 acquires the value G(n) via the following simple recurrence:

$$G(n)=(G(n-1)\cdot(n-1)+E(n))/n$$

If the statistical quantity G(n) is a variance, the average of the squares reduced from the square of the average simply needs to be considered, with each average being computed using the recurrence formula provided above.

Incremental methods other than a simple recurrence of course can be contemplated as an alternative embodiment.

As indicated above, the assessment module 8 assesses the statistics STAT3 over time windows with a width equal to multiple integers Q1, Q2, etc., of the period T, for example, Tlong=Q13T, Q2.T, etc.

To this end, at the end of each period of width T the statistics STAT3 on Tlong simply need to be updated. Each statistic is updated, in the embodiment described herein, using the EMA technique described above on the values of the statistics STAT2, by selecting the smoothing constant A as a function of the multiple Q1, Q2, etc., considered to select the time window Tlong over which the statistics sTAT3 are assessed. For example, if Tlong=Q1.T, the assessment module 8 selects A=2/(1+Q1)) as the smoothing constant, according to the formula of the prior art introduced above. This latter formula can be applied since the elements (statistics STAT2) that are considered in the EMA computation are periodic elements of period T.

Of course, as an alternative embodiment, another incremental computation technique can be used, such as, for example, a simple recurrence formula as introduced above for computing the statistics STAT2.

In other words, if, for example, an initial statistic STAT2 is assessed via a periodic window technique over a period T of a few minutes, then the statistics STAT3 can be easily periodically assessed over one hour, over 24 hours, over the previous days, etc., via an EMA technique or another incremental technique, such as a simple recurrence technique, with minimal computation and without having to store elements other than the statistics themselves.

As mentioned above, in the embodiment described herein, the NF2 entity adopts an incremental approach for computing the statistics STAT1, STAT2, sTAT3: this approach allows the amount of data to be stored in the memory in order to implement the invention to be reduced. However, in another embodiment, it is possible to contemplate storing, for each considered time period over which the statistics STAT1, STAT2 and STAT3 are assessed, the data necessary for their assessment, and assessing the statistics based on the stored data at the end of this period.

In the embodiment described herein, when updating the context CNT(U), in addition to updating the table TAB(U), the NF2 entity also estimates a statistic, called profiling statistic, for the user U by means of its estimation module 9, which profiling statistic is associated with the type of detected event (step F48). This profiling statistic in this case is made up of an indicator estimating the activity of this type of event for the equipment UE(U) over a long moving period, for example, equal to several times the previously considered period T for the assessment of the statistics STAT2 or corresponding to a determined number Ne of events. In the embodiment described herein, the activity indicator of a type of event comprises an estimate of the average and of the variance of the temporal separation between two events of this type, that the estimation module 9 in this case incrementally estimates by means of the EMA technique described above.

As an alternative embodiment, other activity indicators of a type of event can be estimated when updating the context CNT(U) of the user U, such as, for example, an estimate of the regularity of the occurrence of this type of event for the equipment UE(U) of the user U.

The contexts CNT of the users of the network managed by the NF2 entity are updated upon each new event detected in the network in relation to the user equipments UE of these users. Steps F20 to F40 which have just been described are then repeated in order to process this new event.

It should be noted that in the embodiment described herein, in order to limit the number of entries in the table TAB(U) of each user U (for obvious reasons of complexity and required memory space), the NF2 entity implements a mechanism for filtering the entries of the table TAB(U). Indeed, as previously indicated, during step F42, when a new event relating to the equipment UE(U) is detected, each state of the equipment UE(U) impacted by this event is recorded in the table TAB(U) either in an existing entry or in a new entry. The table TAB(U) therefore may have to include a large number of entries in the case of very versatile states of the equipment UE(U). In order to overcome this disadvantage, a maximum number K of entries in the table TAB(U) is set in order to maintain a reasonably sized table TAB(U) for each user U. The value selected for K can vary from one NF entity to another (depending on the nature of the network function hosted by the NF entity), and/or as a function of other parameters such as, for example, the observed time period, the use that is made of the network, the context in which the invention is implemented, etc.

The NF2 entity then implements a mechanism for filtering the entries (in other words data collected and stored in the table TAB(U)) as a function of the representativity of this data of the state of the equipment UE(U) of the user U. More particularly:

- if an entry must be added, the NF2 entity creates an entry in a temporary table TAB_TEMP(U) (limited to an integer M of entries, wherein M can be different from K) via its collection module 7, with the collected data and timestamp information of the collected data that allow the statistics to be initialized;
- if an entry is updated, the NF2 entity updates one of the already existing entries from among the K entries of the table TAB(U) or the M temporary entries of the temporary table TAB_TEMP(U) via its collection module 7. In this case, an entry of the temporary table TAB_TEMP(U) is a candidate for becoming permanent and being stored in the table TAB(U) of the user U. If the table TAB(U) already includes K entries, then an entry of the table TAB(U) is deleted by the collection module 7 of the NF2 entity. To this end, the collection module 7 identifies the entry of the table TAB(U) of lesser importance with respect to a determined criterion such as, for example, the time the equipment UE(U) has remained in the state associated with this entry, the separation between two occurrences of this state, the timestamp of the last occurrence of this state, etc. A combination of several criteria also can be contemplated: for example, the collection module 7 holds the entries corresponding to the longest times for remaining in the states associated with these entries, then considers the entries having the smallest separations between two occurrences of the states associated with them, then the entries associated with the states having the most recent timestamps. Of course, other criteria can be contemplated as an alternative embodiment.

If the temporary table TAB_TEMP(U) is saturated, the collection module 7 also filters the entries contained in this temporary table, for example, based on a timestamp criterion of the recorded data.

As an alternative embodiment, or in addition to the preceding filtering mechanism, the collection module 7 can also a priori filter (i.e., delete) the data corresponding to a short duration of the equipment UE(U) remaining in a state, that is, below a predetermined threshold duration, even before any insertion into the temporary table TAB(U).

The filtering mechanism that has just been described advantageously allows only the most significant data (that is, the most representative) of the usual states of the equipment UE(U) of the user U to be held in the table TAB(U). In the embodiment described herein, it is supplemented by filtering, in other words a deletion, of the excessively old contexts of inactive users held by the NF2 entity so as to keep only a limited number of active and inactive user contexts in its non-volatile memory 5.

Based on the timestamp of the last event detected for the user equipment of a given user, the NF2 entity can estimate how long the relevant user equipment has been inactive, if applicable, and delete the context associated with this user if the estimate exceeds a given maximum duration for holding an inactive context. This filtering can be implemented periodically or if a given maximum number of inactive contexts stored in the non-volatile memory 5 of the NF2 entity is reached.

Of course, other filtering mechanisms and other criteria can be implemented by the NF2 entity in order to preserve its memory resources. For example, instead of filtering the data least representative of the usual states of the equipment UE(U), it is otherwise possible to decide to keep these data that can provide interesting contextual information for the NWDAF entity and otherwise delete certain stored data that are more compliant with an expected or usual state of the equipment UE(U), for example, because they are redundant with other data or in accordance with the statistics assessed by the NF2 entity (that is, they do not provide additional information).

As mentioned above, in the embodiment described herein, the NWDAF entity has subscribed to the NF2 entity in order to be periodically notified, for example, for all the time periods of duration Tnotif, of the items of information collected by the NF2 entity in relation to the events detected thereby for the equipment UE(U). Thus, if the time period Tnotif for notifying the NWDAF entity is reached ("yes" response in test step F50), the NF2 entity notifies the NWDAF entity, via its transmission module 10, of all the items of information that it has collected for the equipment UE(U) of the user U over the time period Tnotif (step F60).

More particularly, it provides the following items of information for the equipment UE(U):

- the last update of the statistics that it has assessed for the states of the equipment UE(U) that have been modified during the period Tnotif, in other words, in this case, the statistics STAT1, STAT2, STAT3 of the states of the equipment UE(U) assessed until the time period Tnotif has elapsed;
- the data collected by the collection module 7 of the NF2 entity concerning the X last events only, detected for the equipment UE(U) and stored in the table PAST(U) (no provision of the other collected data beyond this "recent" past). In an alternative embodiment, the NF2 entity only feeds back the collected data for the X last events that impacted the states modified during the period Tnotif; and
- the profiling statistics estimated for each type of event detected during the notification time period Tnotif.

It should be noted that, as an alternative embodiment, the NF2 entity can notify the NWDAF entity of the aforementioned items of information based on criteria other than a periodic criterion. Moreover, in an alternative embodiment, rather than subscribing to the NF2 entity for notification of these items of information, the NWDAF entity can periodically or occasionally request that the NF2 entity notifies it of the items of information that it has collected during the previous period.

With reference to FIG. 3, upon reception of the items of information as notified by the NF2 entity via its reception module 11 (step E30), the NWDAF entity uses these items of information (as well as those it has received in the past) to carry out the statistical analysis or the prediction requested of it by the NF1 customer entity (step E40). To this end, it proceeds, in a manner known per se, by using its analysis and prediction module 12. To this end, the NWDAF entity advantageously has not only the statistics previously established by the NF2 entity, but also contextual information that will supplement these statistics, by virtue of the provision of the raw collected data relating to the X last events detected for the equipment UE(U), with this contextual information being able to prove useful for conducting the statistical analysis and/or the prediction requested by the NF1 entity.

By virtue of the invention, the number of items of information exchanged between the NF2 entity and the NWDAF entity, and the amount of information stored by the NF2 entity, are limited, yet without sacrificing the representativity of these items of information and their usefulness for the NWDAF entity.

Throughout the remainder of the description, an illustrative example is provided of the items of information that can be collected/assessed and provided by an AMF type NF entity to an NWDAF entity. The AMF entity can hold, for each of the users U that it manages:

- statistics STAT2 of the states of the equipment UE(U) assessed over a previous time period of duration T. For example, the AMF entity counts the most frequent locations of the equipment UE(U) over a period of duration T=1 hour;
- statistics STAT3 of the states of the equipment UE(U) assessed over a previous long time period, that is, averages of the statistics STAT2 assessed over periods of duration T For example, the AMF entity can count the most frequent locations of the equipment UE(U) over the last 8 hours (Q1=8), over 24 hours (Q2=24) before or over the previous week (Q3=168);
- the list PAS (U) of the last events detected for the equipment UE(U) over a maximum time window (for example, the X=30 last events or the events detected over the last 120 minutes) and the data collected during these events. It should be noted that the selection of a number X of events rather than a duration dispenses with the case whereby the arrival rates are highly variable for the users; and
- profiling statistics measuring the average delay and the variance between two events of the same type for the equipment UE(U) for all the events that can be exposed for the user equipment UE(U) by the AMF entity (for example, loss of connectivity, accessibility of the terminals of the users, location report, etc.).

In the embodiment that has just been described, mechanisms are provided for limiting the amount of information stored by the NF entities as well as the amount of information fed back by the latter to the NWDAF entity. In addition to these mechanisms, a careful choice of the deployment parameters of the invention (dimensions of the tables held by the NF entities, widths of the considered time windows for constructing the statistics, etc.) can allow the implementation cost of the invention to be limited even further and allow this implementation to be made more efficient.

The deployment parameters particularly can be dimensioned as a function of the average activity of the users in the network NW. They also can vary depending on the nature of the network, and in particular the application for which it is intended (for example, flexible workshop, telephone network company, public network, gas meter network, vehicle network).

In the embodiment that has been described, the following parameters may need to be set depending on the implementation adopted to assess the statistics:

- number of events Z observed and exposed by each NF entity, for example, for an AMF entity Z=16 according to document TS 29.518, v16.4.0;
- number K of entries of the table TAB(U), for example, for an NF entity, 10 to 15 favorite locations. However, this number can vary as a function of the user U;
- the width T of the considered periodic window for assessing the statistics STAT2, for example, T=30 minutes for a public network NW;
- the number N1 of statistics STAT3 of long assessed periods, for example, N1=3;
- the multiples Q1, Q2, . . . , QN1 of the period T for defining the considered long periods for computing the statistics STAT3, for example, for N1=3 and T=30 minutes, Q1=4 (resulting in a period of 2 hours), Q2=16 (resulting in a period of 8 hours) and Q3=48 (resulting in a period of 24 hours);
- the number Ne of considered events in the sliding window for computing the profiling statistics (activity indicators of each type of event), for example Ne=40;
- the number X of recent events stored in the table PAST(U) and stored in the memory, for example, X=10.

The number of items of information an NF entity periodically provides the NWDAF entity with is provided in table 1 (the size of each item of information that is provided is omitted in this case for the sake of simplification, with the size depending on the amount of data included in each element and on the dimension of these data). In this case, it is assumed that the NF entity provides statistics STAT1, STAT2, STATS for each state of the equipment UE(U) of the user U, the recent past of the X last events, and a profiling indicator for each type of event exposed by the NF entity.

TABLE 1

| Items of information | Quantity |
| --- | --- |
| Statistics STAT1 | K |
| Statistics STAT2 assessed over a recent period of width T | K |
| Statistics STAT3 assessed over longer periods (T · Qi) | N1 · K |
| Data collected for the X last events | X |
| Profiling indicators for each type of event | Z |
| TOTAL | (N1 + 2) · K + X + Z |

Thus, in view of the above, in order to set the deployment parameters, a compromise can be sought, for example, between:

- a reasonable size of information to be held and to be stored on each NF entity;
- excessively large flows of notifications (in particular periodic notifications) when feeding back the statistics; and
- good observability of the states of the UE of each user.

Table 2 provides, by way of an illustration, two examples of strategies for setting the parameters that can be adopted in order to reach this compromise for an AMF entity:

TABLE 2

| Parameters | Strategy 1 - short-term | Strategy 2 - long-term |
|---|---|---|
| Z | 16 | 16 |
| K | 10 | 20 |
| T | 5 minutes | 30 minutes |
| N1 | 2 | 4 |
| Q1, Q2, ... QN1 | Q1 = 3 (period of a quarter of an hour) | Q1 = 2 (period of an hour) |
|  | Q2 = 12 (period of an hour) | Q2 = 16 (period of 8 hours) |
|  |  | Q3 = 48 (period of one day) |
|  |  | Q4 = 336 (period of one week) |
| Ne | 40 | 40 |
| X | 10 | 20 |
| TOTAL | 66 items of information | 156 items of information |
| Notification period Tnotif | 1 notification per hour | 1 notification per day |

Of course, these examples are provided solely by way of an illustration and other criteria can be contemplated for setting the deployment parameters of the invention.

In the embodiment, and in the illustrative examples described herein, the data provision entity has been considered to be an NF entity hosting a network function and that the data analytics entity is a centralized DAF or NWDAF entity of the network NW. The invention is nevertheless applicable in other contexts, as mentioned above. Thus, for example, the data provision entity can be an equipment (UE) of the user, such as their terminal, and the data collected during events detected by this user equipment or by the network that impacted at least one state of the user equipment is the data of interest. The analytics entity can be an NF entity or another entity of the network capable of analyzing data it is provided with, and, for example, of carrying out predictions or statistical analyses based on these data.

Although the present disclosure has been described with reference to one or more examples, workers skilled in the art will recognize that changes may be made in form and detail without departing from the scope of the disclosure and/or the appended claims.

The invention claimed is:

1. A provision method for providing a data analytics entity of a network with data relating to at least one user equipment, said method being implemented by a providing entity and comprising:
   collecting, for each event of a plurality of events detected in the network, wherein each event results in a transition between first and second states of said user equipment in the network, raw data relating to at least one of the first and second states of the user equipment impacted by the event;
   aggregating raw data relating to the at least one impacted state collected during the collecting to acquire at least one statistic; and
   providing said data analytics entity with the following for at least one impacted state of said user equipment:
      the at least one statistic acquired for this state by aggregating the raw data relating to this state collected for the plurality of events during the collecting; and
      a portion of the raw data relating to this state collected during the collecting and corresponding to an integer X greater than or equal to 1 of events from among the most recent events of said plurality of events.

2. The provision method as claimed in claim 1, wherein the collecting and providing are implemented by the providing entity of the network, which manages a plurality of user equipment.

3. The provision method as claimed in claim 1, wherein the collecting and the providing are implemented by said user equipment, which corresponds to the providing entity.

4. The provision method as claimed in claim 1, further comprising providing said data analytics entity, for each type of event of said plurality of events, with at least one activity indicator for this type of event.

5. The provision method as claimed in claim 1, comprising incrementally updating at least one of said statistics relating to one of said first and second states of said user equipment for each detected event relating to said user equipment and impacting said state.

6. The provision method as claimed in claim 1, comprising assessing at least one of said statistics over a sliding time window or over a periodic time window with a period denoted T or over a time window with a width that is equal to an integer multiple of the period T.

7. The provision method as claimed in claim 1, comprising assessing at least one of said statistics and/or an activity indicator using an exponential moving average.

8. The provision method as claimed in claim 1, comprising filtering the collected raw data as a function of a representativity of said raw data of an usual state of the user equipment.

9. The provision method as claimed in claim 1, wherein the providing is implemented periodically and/or in response to a request from the data analytics entity.

10. A method comprising:
   acquiring by a data analytics entity of a network data relating to at least one user equipment, said data analytics entity being able to communicate with at least one other entity configured to collect, for each event of a plurality of events detected in the network, wherein each event results in a transition between first and second states of said user equipment in the network, raw data relating to at least one of the first and second states of the user equipment impacted by the event, said acquiring comprising:
   receiving the following for at least one impacted state of said user equipment:
   at least one statistic acquired by the other entity for this state by aggregating raw data relating to the at least one impacted state collected for the plurality of events by said other entity; and
   a portion of the raw data relating to the at least one impacted state collected by said other entity for said plurality of events, with said portion of the raw data corresponding to an integer X greater than or equal to 1 of events from among the most recent events of said plurality of events.

11. A non-transitory computer-readable storage medium comprising instructions of a computer program stored thereon which when executed by a processor of a providing entity configure the providing entity to implement a method for providing a data analytics entity of a network with data relating to at least one user equipment, said method comprising:
   collecting, for each event of a plurality of events detected in the network, wherein each event results in a transition between first and second states of said user equipment in the network, raw data relating to at least one of the first and second states of the user equipment impacted by the event;

aggregating raw data relating to the at least one impacted state collected during the collecting to acquire at least one statistic; and providing said data analytics entity with the following for at least one impacted state of said user equipment:
- the at least one statistic acquired for this state by aggregating the raw data relating to this state collected for the plurality of events during the collecting; and
- a portion of the raw data relating to this state collected during the collecting and corresponding to an integer X greater than or equal to 1 of events from among the most recent events of said plurality of events.

12. An entity comprising:
a processor; and
a non-transitory computer readable medium comprising instructions stored thereon which when executed by the processor configure the entity to:
collect, for each event of a plurality of events detected in a network, wherein each event results in a transition between first and second states of at least one user equipment in the network, raw data relating to at least one of the first and second states of the user equipment impacted by said event;
acquire, for at least one impacted state of the user equipment, at least one statistic by aggregating raw data relating to this state that is collected; and
transmit to a data analytics entity of the network, for said at least one impacted state of the user equipment:
- said at least one statistic acquired for this state by aggregating the raw data relating to this state collected for the plurality of events during the collecting; and
- a portion of the raw data collected relating to this state and corresponding to an integer X greater than or equal to 1 of events from among the most recent events of said plurality of events.

13. A data analytics entity of a network able to communicate with another entity configured to collect, for each event of a plurality of events detected in the network, wherein each event results in a transition between first and second states of at least one user equipment in the network, raw data relating to at least one of the first and second states of the user equipment impacted by the event, said analytics entity comprising:
a processor; and
a non-transitory computer readable medium comprising instructions stored thereon which when executed by the processor configure the data analytics entity to acquire the following from said other entity for at least one impacted state of said user equipment:
at least one statistic acquired by said other entity for said impacted state by aggregating raw data relating to the at least one impacted state collected for the plurality of events by said other entity; and
a portion of the raw data relating to the at least one impacted state collected by said other entity for said plurality of events, with said portion of the raw data corresponding to an integer X greater than or equal to 1 of events from among the most recent events of said plurality of events.

14. The provision method as claimed in claim 1, wherein the raw data corresponds to facts or information concerning the facts taking place in the network.

15. A provision method for providing a data analytics entity of a network with data relating to at least one user equipment, said method being implemented by a providing entity and comprising:
collecting, for each event of a plurality of events detected in the network, wherein each event results in a transition between first and second states of said user equipment in the network, raw data relating to at least one of the first and second states of the user equipment impacted by the event;
aggregating raw data relating to the at least one impacted state collected during the collecting to acquire at least one statistic;
providing said data analytics entity with the following for at least one impacted state of said user equipment:
- the at least one statistic acquired for this state by aggregating the raw data relating to this state collected for the plurality of events during the collecting; and
- a portion of the raw data relating to this state collected during the collecting and corresponding to an integer X greater than or equal to 1 of events from among the most recent events of said plurality of events; and
providing said data analytics entity, for each type of event of said plurality of events, with at least one activity indicator for this type of event wherein one of said activity indicators of said type of events comprises an estimate of a separation duration between two events of this type detected for said user equipment.

* * * * *